US008243239B2

(12) United States Patent
Choi et al.

(10) Patent No.: US 8,243,239 B2
(45) Date of Patent: Aug. 14, 2012

(54) IN-PLANE SWITCHING MODE LIQUID CRYSTAL DISPLAY

(75) Inventors: Jeong-Min Choi, Daejeon (KR); Min-Hee Lee, Daejeon (KR); Sae-Han Cho, Daejeon (KR)

(73) Assignee: LG Chem, Ltd., Seoul (KR)

( * ) Notice: Subject to any disclaimer, the term of this patent is extended or adjusted under 35 U.S.C. 154(b) by 400 days.

(21) Appl. No.: 12/461,864

(22) Filed: Aug. 26, 2009

(65) Prior Publication Data
US 2010/0053508 A1    Mar. 4, 2010

(30) Foreign Application Priority Data

Aug. 27, 2008  (KR) .............................. 2008-0083830

(51) Int. Cl.
*G02F 1/1335*    (2006.01)
*G02F 1/1343*    (2006.01)

(52) U.S. Cl. ...................... 349/118; 349/119; 349/141

(58) Field of Classification Search .......... 349/117–121, 349/141
See application file for complete search history.

(56) References Cited

U.S. PATENT DOCUMENTS

| 7,283,189 | B2 | 10/2007 | Jeon et al. | |
| 7,732,024 | B2* | 6/2010 | Mazaki et al. | 428/1.3 |
| 2004/0046916 | A1* | 3/2004 | Lyu et al. | 349/130 |
| 2005/0110933 | A1* | 5/2005 | Jeon et al. | 349/141 |
| 2005/0200792 | A1 | 9/2005 | Jeon et al. | |
| 2006/0285051 | A1 | 12/2006 | Jeon et al. | |
| 2007/0085951 | A1* | 4/2007 | Hale et al. | 349/117 |
| 2008/0079877 | A1* | 4/2008 | Nakatsugawa | 349/118 |

FOREIGN PATENT DOCUMENTS

| KR | 2005-0049137 A | 5/2005 |
| KR | 2005-0073221 A | 7/2005 |
| KR | 2006-0045914 A | 5/2006 |
| KR | 2008-0036406 A | 4/2008 |
| KR | 2006-0130502 A | 12/2008 |
| WO | WO 2008/050990 | 5/2008 |

OTHER PUBLICATIONS

Serguei Palto et al., "51.3: Thin Coatable Birefringent Films and Their Application to VA and IPS Mode LCDs", SID 2007, 2007 SID International Symposium, Society for Information Display, Los Angeles, USA, vol. XXXVIII, May 20, 2007, pp. 1563-1565, XP007013319.
Kajita D et al., "21.2: IPS-LCD with High Contrast Ratio Over 80:1 at All Viewing Angles", SID 2006, 2006 SID International Symposium, Society for Information Display, vol. XXXVII, May 24, 2005, pp. 1162-1165, XP007012685.

* cited by examiner

*Primary Examiner* — Mark Robinson
*Assistant Examiner* — Charles Chang
(74) *Attorney, Agent, or Firm* — McKenna Long & Aldridge LLP

(57) ABSTRACT

The present invention relates to an in-plane switching (IPS) mode liquid crystal display. More particularly, the IPS mode liquid crystal display according to the present invention comprises 1) a first polarizing plate; 2) a liquid crystal cell; 3) a retardation film comprising a positive biaxial acryl-based film and a negative C plate; and 4) a second polarizing plate. Accordingly, a contrast property can be improved at a front side of the IPS mode liquid crystal display and at an inclining angle.

21 Claims, 1 Drawing Sheet

[Fig. 1]

IN-PLANE SWITCHING MODE LIQUID CRYSTAL DISPLAY

TECHNICAL FIELD

The present invention relates to an in-plane switching (IPS) mode liquid crystal display.

This application claims priority from Korean Patent Application No. 10-2008-0083830 filed on Aug. 27, 2008 in the Korean Intellectual Property Office, the disclosure of which is incorporated herein by reference in its entirety.

BACKGROUND ART

Recently, display technologies using various methods such as a plasma display panel (PDP), a liquid crystal display (LCD) and the like that are used instead of a known brown tube in accordance with the development of optical technologies are suggested and sold. The higher properties of the polymer material for displays are required. For example, in the case of the liquid crystal display, according to the development toward the thin film, the lightness, and enlargement of the screen area, the wide viewing angle, the high contrast, the suppression of change in image color tone according to the viewing angle and the uniformity of the screen display are particularly considered as important problems.

Therefore, various polymer films such as a polarizing film, a retardation film, a plastic substrate, a light guide plate and the like are used.

Currently, various modes of liquid crystal displays such as twisted nematic (TN), super twisted nematic (STN), vertical alignment (VA), in-plane switching (IPS) liquid crystal cells are developed. Since all of these liquid crystal cells have intrinsic liquid crystal alignment, they have intrinsic optical anisotropic property, and in order to compensate the optical anisotropic property, a film in which a retardation function is provided by stretching various kinds of polymers has been suggested.

This retardation film is produced through a method such as vertical monoaxial stretching, step biaxial stretching, simultaneous biaxial stretching and the like after various polymer films are produced. The retardation film that is produced through the stretching process has the positive in-plane retardation value and the negative thickness retardation value, and these films can be applied to a VA (Vertical Alignment) mode of the liquid crystal modes.

In particular, in the IPS (in-plane switching) mode of the liquid crystal modes, the retardation film that has the positive in-plane retardation value and the positive thickness retardation value is required, the molecules of the most polymer films are arranged in a stretching direction while stretching is carried out, and it has the positive in-plane retardation value and the negative thickness retardation value.

In general, a compensation film for IPS mode compensates a viewing angle by uniaxially stretching a COP (cyclic olefin polymer) and coating a nematic liquid crystal that is the +C plate. However, in this case, since the birefringence of the liquid crystal is very high, when the alignment and the coating thickness of the liquid crystal are slightly changed, the retardation of the entire compensation film is largely changed. Thus, in the case of thin film, there is a problem in that it is difficult to control the retardation. In addition, because of the cost of the expensive liquid crystal, the production cost is increased. Therefore, there is a disadvantage in that it is difficult to generally commercialize it.

DISCLOSURE

Technical Problem

It is an object of the present invention to provide an IPS (in-plane switching) mode liquid crystal display comprising a retardation film that is capable of appropriately controlling an in-plane retardation value and a thickness retardation value in order to improve a viewing angle property of the IPS (in-plane switching) mode liquid crystal display.

Technical Solution

In order to accomplish the above object, the present invention provides an IPS (in-plane switching) mode liquid crystal display, which comprises 1) a first polarizing plate; 2) a liquid crystal cell; 3) a retardation film comprising a positive biaxial acryl-based film and a negative C plate; and 4) a second polarizing plate.

Advantageous Effects

The present invention utilizes the positive biaxial acryl-based film and the negative C plate as the retardation film, such that a contrast property can be improved at the front side and the inclination angle of the IPS (in-plane switching) mode liquid crystal display. Therefore, the clear image of the liquid crystal display can be implemented.

BEST MODE

Hereinafter, the present invention will be described in detail.

A liquid crystal panel according to the present invention may be an O mode, or E mode. The O mode liquid crystal panel means a mode in which an absorption axis direction of a polarizer that is disposed at the backlight side of the liquid crystal cell and the alignment direction of the liquid crystal cell are parallel to each other. The E mode liquid crystal panel means a mode in which an absorption axis direction of the polarizer that is disposed at the backlight side of the liquid crystal cell and the alignment direction of the liquid crystal cell are vertical to each other.

Figure 1A:
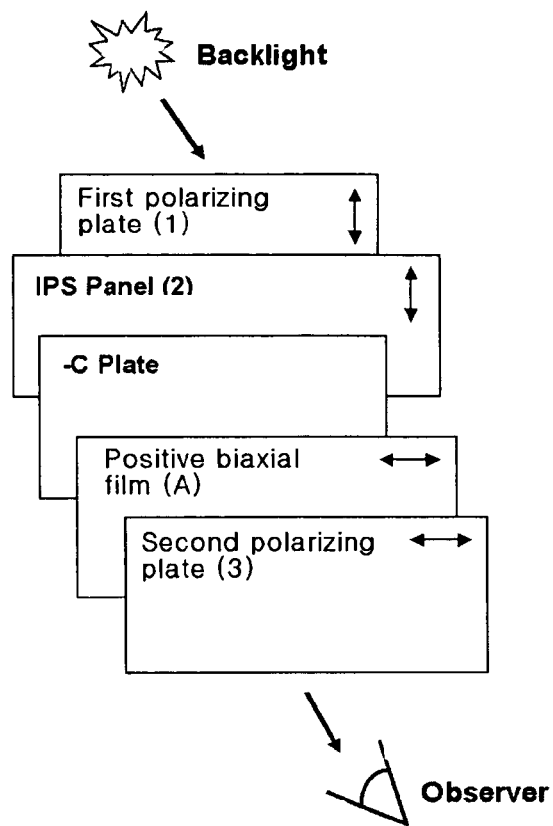
FIG. 1(a) is a view that illustrates a basic structure of an IPS mode liquid crystal display for O-Mode according to the present invention.
Figure 1B:
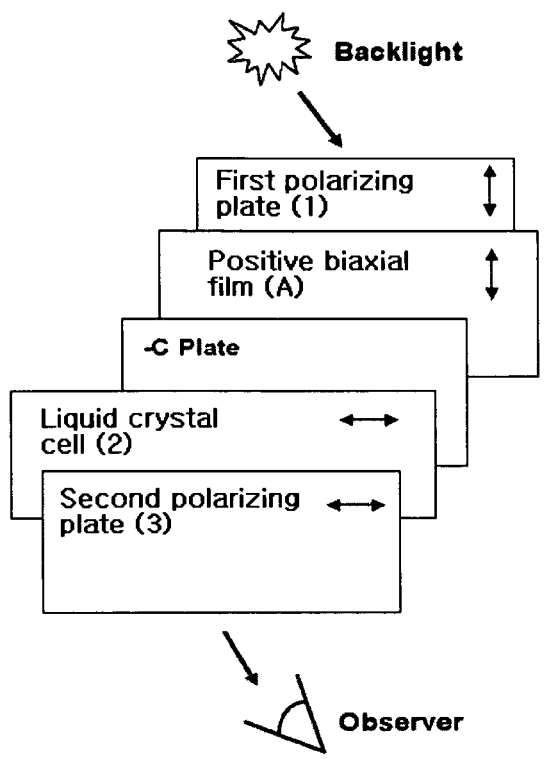
FIG. 1(b) is a view that illustrates a basic structure of an IPS mode liquid crystal display for E-Mode according to the present invention.

With reference to FIG. 1(a), in the case of the O mode liquid crystal panel, it is preferable that a second polarizing plate 3, a positive biaxial film A and a negative C plate are disposed at an observer side of the liquid crystal cell 2, and the first polarizing plate 1 is disposed at the backlight side of the liquid crystal cell. With reference to FIG. 1(b), in the E mode liquid crystal panel, it is preferable that the second polarizing plate 3 is disposed at the observer side of the liquid crystal cell 2, and the first polarizing plate 1, the positive biaxial film A and the negative C plate are disposed at the backlight side of the liquid crystal cell 2.

Therefore, the IPS mode liquid crystal display for O mode according to the present invention is characterized in that the first polarizing plate is disposed at the backlight side of the liquid crystal cell, and the second polarizing plate and the retardation film comprising the positive biaxial acryl-based film and the negative C plate are disposed at the observer side of the liquid crystal cell.

In the IPS mode liquid crystal display for O mode, it is preferable that the absorption axis of the first polarizing plate and the absorption axis of the second polarizing plate are vertical to each other, the optical axis of the liquid crystal in the liquid crystal cell is parallel to the absorption axis of the first polarizing plate, and the optical axis of the positive biaxial acryl-based film is parallel to the absorption axis of the second polarizing plate, but it is not limited thereto.

In addition, the IPS mode liquid crystal display for E mode according to the present invention is characterized in that the first polarizing plate and the retardation film comprising the positive biaxial acryl-based film and the negative C plate are disposed at the backlight side of the liquid crystal cell, and the second polarizing plate is disposed at the observer side of the liquid crystal cell.

In the IPS mode liquid crystal display for E mode, it is preferable that the absorption axis of the first polarizing plate and the absorption axis of the second polarizing plate are vertical to each other, the optical axis of the liquid crystal in the liquid crystal cell is parallel to the absorption axis of the second polarizing plate, and the optical axis of the positive biaxial acryl-based film is parallel to the absorption axis of the first polarizing plate, but it is not limited thereto.

In the IPS mode liquid crystal display according to the present invention, the positive biaxial acryl-based film of 3) may be produced by forming a film according to a melt extruding method or a solution casting method by using an acryl-based polymer and performing a TD (transverse direction) stretching process.

The stretching process that is carried out while the positive biaxial acryl-based film of 3) is produced may carry out the TD stretching after the vertical uniaxial stretching or only the TD stretching. Since the TD stretching is carried out while both ends of the film are grasped by using grips during the stretching process, the biaxial stretching property can be shown, such that the biaxial stretching film can be produced.

In more detail, the TD stretching process is carried out to increase the width of the film by using clips in a stretching process, and it may carry out a preheating step, a stretching step and a heat treatment step individually, and it may carry out the steps continuously. In the stretching step, in consideration of the glass transition temperature (Tg) of the acryl-based non-stretched film, within a temperature range of (Tg–10° C.) to (Tg+10° C.), a process can be carried out in a reverse direction of a progress direction of the film, that is, the TD stretching process can be carried out. The stretching temperature in the stretching process depends on the kind of used resin, but it is generally in the range of 80 to 250° C., preferably 100 to 200° C., and more preferably 110 to 160° C. In the stretching step, the stretching ratio may be set by the thickness of the non-stretched film and appropriate implementation of the retardation value, and it is preferable that the ratio is in the range of 1.1 to 4 times.

It is preferable that the acryl-based polymer comprises the acryl-based copolymer that comprises the acryl-based monomer, aromatic vinyl monomer, maleic anhydride-based monomer and vinylcyan-based monomer.

The acryl-based monomer that is disclosed in the present specification comprises acrylate and an acrylate derivative, and it is understood that it comprises alkyl acrylate, alkyl methacrylate, alkyl butacrylate or the like. For example, examples of the acryl-based monomer comprise a compound that is represented by the following Formula 1:

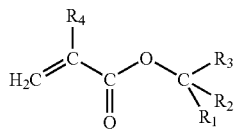

[Formula 1]

wherein $R_1$, $R_2$ and $R_3$ each independently represent a monovalent hydrocarbon group having 1 to 30 carbon atoms, that includes hydrogen or a hetero atom or not, and at least one of $R_1$, $R_2$ and $R_3$ may be an epoxy group; and $R_4$ represents a hydrogen atom or an alkyl group having 1 to 6 carbon atoms.

In detail, as the acryl-based monomer, methyl methacrylate, ethyl methacrylate, propyl methacrylate, n-butyl methacrylate, t-butyl methacrylate, cyclohexyl methacrylate, benzyl methacrylate, methoxyethyl methacrylate, ethoxyethyl methacrylate, butoxymethyl methacrylate, and oligomers thereof may be used, but it is not limited thereto.

It is preferable that the content of the acryl-based monomer in the acryl-based copolymer is in the range of 40 to 99 wt %. In the case of when the content of the acryl-based monomer is less than 40 wt %, high heat resistance and high transparency that are intrinsic properties of the acryl-based polymer may not be sufficiently implemented. In the case of when the content of the acryl-based monomer is more than 99 wt %, there is a problem in that mechanical strength is lowered.

As the aromatic vinyl monomer of the acryl-based copolymer, there are styrene, α-methyl styrene, 4-methyl styrene and the like. Styrene is preferable, but the monomer is not limited thereto.

It is preferable that the content of the aromatic vinyl monomer in the acryl-based copolymer is in the range of 1 to 60 wt %.

It is preferable that the content of the maleic anhydride-based monomer in the acryl-based copolymer according to the present invention is in the range of 5 to 30 wt %. In the case of when the content of the maleic anhydride-based monomer is more than 30 wt %, since the brittleness of the film is increased, there is a problem in that the film is easily broken.

As the maleic anhydride-based monomer of the acryl-based copolymer, there is maleic anhydride and the like, and as the vinylcyan-based monomer, there are acrylonitrile, methacrylonitrile, ethacrylonitrile and the like, but they are not limited thereto.

It is preferable that the content of the vinylcyan-based monomer in the acryl-based copolymer is in the range of 0.1 to 10 wt %.

The positive biaxial acryl-based film of 3) may further include the rubber component.

In the present invention, the positive biaxial film means that a refractive index ($n_x$) in a direction in which the refractive index is highest in a plane direction of the film, a refractive index ($n_y$) in a direction that is vertical to the $n_x$ direction in the plane direction of the film, and a refractive index ($n_z$) of the thickness satisfy the correlation of $n_z > n_x > n_y$.

It is preferable that the rubber component is an acryl rubber, a rubber-acryl-based graft type of core-shell polymer, or a mixture thereof, but it is not limited thereto.

In the case of when the acryl-based resin has the refractive index that is similar to that of the rubber component, since the acryl rubber can obtain the thermoplastic resin composition that has excellent transparency, the acryl rubber is not particularly limited as long as the acryl rubber has the refractive index in the range of 1.480 to 1.550, which is similar to the refractive index of the acryl-based resin. For example, there are alkyl acrylate such as butyl acrylate, 2-ethylhexyl acrylate and the like. The rubber-acryl-based graft type of core-shell polymer is not particularly limited as long as it is the rubber-acryl-based graft type of core-shell polymer that has the refractive index in the range of 1.480 to 1.550. For example, particles in which the butadiene, butyl acryllate or butyl acryllate-styrene copolymer-based rubber is used as the core and polymethyl methacrylate or polystyrene is used as the shell and which has the size in the range of 50 to 400 nm may be used.

The content of the rubber component is preferably in the range of 1 to 50 parts by weight, more preferably in the range of 10 to 30 parts by weight on the basis of 100 parts by weight of the acryl-based copolymer. In the case of when the content of the rubber component is less than 1 part by weight, it is impossible to implement excellent mechanical strength of the film, a problem in processing occurs because the film is easily broken, and the optical performance is not sufficiently implemented. In addition, in the case of when the content is higher than 30 parts by weight, there are problems in that the intrinsic high heat resistance and high transparency of the acryl-based copolymer are not sufficiently implemented, and in the stretching process, a haze occurs.

In the positive biaxial acryl-based film of 3), it is preferable that the in-plane retardation value that is represented by the following Equation 1 is in the range of 60 to 150 nm, and the thickness retardation value that is represented by the following Equation 2 is in the range of 100 to 200 nm.

$$R_{in} = (n_x - n_y) \times d \quad \text{[Equation 1]}$$

$$R_{th} = (n_z - n_y) \times d \quad \text{[Equation 2]}$$

wherein $n_x$ is a refractive index in a direction in which the refractive index is highest in a plane direction of the film, $n_y$ is a refractive index in a direction that is vertical to the $n_x$ direction in the plane direction of the film, $n_z$ is a refractive index of the thickness direction, and d is the thickness of the film.

It is preferable that the glass transition temperature (Tg) of the positive biaxial acryl-based film of 3) is in the range of 100 to 250° C. The film that has the glass transition temperature (Tg) in the range of 100 to 250° C. may have excellent durability.

In addition, in the positive biaxial acryl-based film of 3), it is preferable that the in-plane retardation value that is represented by Equation 1 and the thickness retardation value that is represented by Equation 2 satisfy the correlation of $R_{th} > R_{in}$.

In the IPS mode liquid crystal display according to the present invention, in order to minimize penetrating light in a dark state of the polarizing plate, the positive thickness retardation value is required. Since the positive biaxial acryl-based film that is used in the present invention has the $R_{th}/R_{in}$ value that is larger than 1 while the stretching is carried out, it is necessary to reduce the $R_{th}$ value.

Accordingly, the present invention can control the $R_{th}/R_{in}$ value of the entire retardation film by introducing the negative C plate into the positive biaxial acryl-based film.

In the present invention, the negative C plate means that a refractive index $(n_x)$ in a direction in which the refractive index is highest in a plane direction of the film, a refractive index $(n_y)$ in a direction that is vertical to the $n_x$ direction in the plane direction of the film, and a refractive index $(n_z)$ of the thickness satisfy the correlation of $n_x \cong n_y > n_z$.

The negative C plate can be manufactured by manufacturing the 10 to 30 wt % of polymer solution using a material that has a negative retardation value in a thickness direction and high birefringence, and coating it on the positive biaxial acryl-based film in a thin film form. As the material that has the negative retardation value in a thickness direction and high birefringence, there is a compound that comprises aromatic rings or cycloolefines at a main chain of the polymer. More detailed examples thereof may comprise polyarylate, polynorbornene, polycarbonate, polysulfone, polyimide, cellulose and a derivative thereof. The examples are preferably polyarylate and a cellulose derivative, but are not limited thereto.

In particular, polyarylate may comprise a compound that is represented by the following Formula 2.

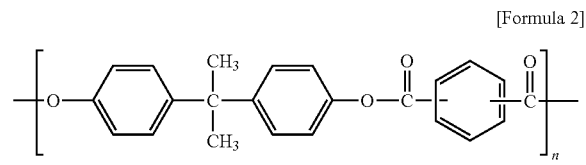

[Formula 2]

wherein n is an integer of 1 or more.

The negative C plate has the in-plane retardation value that is represented by Equation 1 and in the range of preferably 0 to 10 nm, more preferably 0 to 5 nm, and most preferably 0 to 3 nm. In addition, the thickness retardation value that is represented by Equation 2 is in the range of −40 to −150 nm.

The IPS mode liquid crystal display according to the present invention uses a combination of the positive biaxial acryl-based film and the negative C plate as the retardation film, such that a wider viewing angle property can be implemented. That is, since the positive biaxial acryl-based film satisfies the correlation of $R_{th}/R_{in} > 1$ and can be controlled so as to satisfy the correlation of $R_{th}/R_{in} < 1$ by using the negative C plate that has the negative thickness retardation value, light leakage occurring in the polarizing plate and the IPS mode liquid crystal panel can be minimized.

In particular, in the IPS mode liquid crystal display according to the present invention, it is more preferable that the $R_{th}/R_{in}$ value of the acryl-based retardation film of 3) is in the range of 1.1 to 6.

The acryl-based retardation film has the positive in-plane retardation value and the positive thickness retardation value while the stretching is carried out, but the ratio of two values becomes easily larger than 1. Therefore, when the IPS mode liquid crystal display using it is compared to the IPS mode liquid crystal display that does not use the viewing angle compensation film, there are problems in that there is no light leakage at an inclination angle but a relatively low contrast ratio value is ensured.

In the IPS mode liquid crystal display according to the present invention, the in-plane retardation value, which is represented by Equation 1, of 3) the entire retardation film comprising the positive biaxial acryl-based film and the negative C plate is in the range of preferably 60 to 150 nm, and the thickness retardation value that is represented by Equation 2 is in the range of more preferably 30 to 120 nm.

It is preferable that the thickness of the negative C plate is in the range of 0.5 to 30 μm, and the thickness of the entire retardation film comprising the positive biaxial acryl-based film and the negative C plate is in the range of 20 to 100 μm, but they are not limited thereto.

In the IPS mode liquid crystal display according to the present invention, 3) the retardation film may further include a buffer layer between the positive biaxial acryl-based film and the negative C plate.

The buffer layer may improve an adhesion strength between the positive biaxial acryl-based film and the negative C plate, and prevent a solvent corrosion in respects to a substrate. The buffer layer may comprise a compound that is selected from the group consisting of a UV curable or thermal curable acrylate polymer, a methacrylate polymer, and an acrylate/methacrylate copolymer, but is not limited thereto. In addition, the material may comprise pure polymer that is not cured, and as this material, there are a cellulose derivative, styrenes, anhydrides and a copolymer including them.

The buffer layer may be formed in a range where a coating processing property is good while the solvent is not precipitated, and in detail, the thickness of the buffer layer may be in the range of 0.2 to 3 μm.

In addition, 3) the retardation film may further include the adhesive layer between the positive biaxial acryl-based film and the negative C plate.

The adhesive layer may be implemented through the coating on the negative C plate layer, or may be attached to the acryl-based film through the transferring. The adhesive layer may be selected from the group consisting of natural rubber, synthetic rubber or elastomer, vinyl chloride/vinyl acetate copolymer, polyvinylalkyl ether, polyacrylate, modified polyolefine-based compounds, and a compound comprising a curing agent such as isocyanate, but is not limited thereto.

In addition, the optical axis of the positive biaxial acryl-based film is characterized in that the optical axis is parallel to the absorption axis of 4) the second polarizing plate. In the case of when the optical axis of the positive biaxial acryl-based film is not parallel to the absorption axis of 4) the second polarizing plate, a light leakage phenomenon may occur by light leakage between the first polarizing plate and the second polarizing plate at an inclination angle on an optical path.

In the IPS mode liquid crystal display according to the present invention, the absorption axis of 1) first polarizing plate is vertical to the absorption axis of 4) the second polarizing plate.

1) the first polarizing plate and 4) the second polarizing plate comprises a polarizing element. As the polarizing element, a film that comprises polyvinyl alcohol (PVA) having iodine or dichromatic dyes may be used. The polarizing element may be manufactured by dyeing the iodine or dichromatic dyes on the PVA film, but the manufacturing method thereof is not particularly limited.

1) the first polarizing plate and 4) the second polarizing plate may comprise a protective film on any one side or both sides of the polarizing element.

As the protective film, there are a triacetate cellulose (TAC) film, a polynorbornene-based film that is manufactured by using ring opening metathesis polymerization (ROMP), a HROMP (ring opening metathesis polymerization followed by hydrogenation) polymer film that is obtained by rehydrogenating the ring-opened cyclic olefine-based polymer, a polyester film, or a polynorbornene-based film that is manufactured by using the addition polymerization. In addition to this, the film that is made of a transparent polymer material may be used as the protective film, but it is not limited thereto.

In the IPS mode liquid crystal display according to the present invention, 3) the retardation film may be disposed between 4) the second polarizing plate and 2) the liquid crystal cell, and the negative C plate of 3) the retardation film may be disposed so that the negative C plate is adjacent to 2) the liquid crystal cell.

[Mode for Invention]

Hereinbelow, the present invention will be described in detail with reference to the drawings.

FIG. 1(a) illustrates a basic structure of the IPS mode liquid crystal display.

The IPS mode liquid crystal display comprises the first polarizing plate 1, the second polarizing plate 3, and the liquid crystal cell 2, the absorption axis of the first polarizing plate 1 is disposed so that the absorption axis is vertical to the absorption axis of the second polarizing plate 3, the absorption axis of the second polarizing plate 3 is disposed so that the absorption axis is parallel to the optical axis of the positive biaxial acryl-based film A, and the negative C plate layer is disposed between the positive biaxial acryl-based film A and the liquid crystal cell 2. The buffer layer that has no in-plane and thickness retardation values may be disposed between the positive biaxial acryl-based film A and the negative C plate layer, and may further include the adhesive layer.

A better understanding of the present invention may be obtained in light of the following preferable Examples which are set forth to illustrate, but are not to be construed to limit the present invention.

Examples 1 to 5

The IPS mode liquid crystal display that was used in Examples 1 to 5 included the IPS liquid crystal cell in which the liquid crystal having the cell gap of 2.9 μm, the pretilt angle of 3°, the dielectric anisotropic property $\Delta\in$ of 7, the birefringence $\Delta n$ of 0.1 was filled.

As the positive biaxial acryl-based film, the film that had the thickness of about 200 μm was formed by using the extruder that had the diameter of 60Φ and L/D of 32 so that the component content ratio (wt %) of methylmethacrylate:styrene:maleic anhydride:acrylonitrile (MMA:SM:MAH:AN) is 65:24:10:1. After the formed film was stretched using the TD stretching machine at 120° C. by 250 to 350%, the stretched film that had the in-plane retardation value ($R_{in}$) in the range of 90 to 130 nm and the thickness retardation value ($R_{th}$) in the range of 130 to 160 nm was manufactured.

To manufacture the negative C plate, polyarylate (Unitica Co., U-100) was dissolved in 7.5 wt % of dichloroethane, coated on the uniaxially stretched acryl-based copolymer film by using the bar-coater, and dried in the convection oven at 80° C. for 3 min.

The polarizing plate was combined in the order as shown in FIG. 1(a) for the combination of each retardation value, and combined with the IPS mode liquid crystal display panel, and the contrast ratio was measured at the inclination angle of 60° using Eldim to compare the clearness of the image. The second polarizing plate was attached with the polarizing plate that was combined in the order of ORT (zero retardation TAC)/PVA/TAC in Examples and Comparative Examples.

Comparative Example 1

Comparative Example 1 carried out the comparison by attaching the polarizing plate in which the first polarizing plate and the second polarizing plate were combined with each other in the order of ORT/PVA/TAC.

The contrast ratio value is an indicator that displays the clearness of the image, and it is possible to implement the clear image as the contrast ratio value is increased. Accordingly, in the present invention, the clearness of the image was compared by using the contrast property at the inclination angle of 60°.

The test result values of Examples 1 to 5 and Comparative Example 1 are described in the following Table 1.

TABLE 1

| | Positive biaxial film | | Negative C plate | | Contrast ratio at |
|---|---|---|---|---|---|
| | $R_{in}$ (nm) | $R_{th}$ (nm) | $R_{th}$ (nm) | Thickness (μm) | inclination angle of 60° |
| Example 1 | 100 | 130 | −40 | 1.7 | 50:1 |
| Example 2 | 110 | 150 | −60 | 2.7 | 70:1 |
| Example 3 | 120 | 160 | −80 | 4.0 | 100:1 |
| Example 4 | 120 | 160 | −100 | 6.2 | 140:1 |
| Example 5 | 120 | 160 | −120 | 10.4 | 180:1 |
| Comparative Example 1 | 120 | 125 | — | — | 20:1 |

The contrast ratio at inclination angle of 60° is a contrast ratio value at an upward direction angle of 45°.

From the results of Table 1, it can be seen that the contrast ratio values of Examples 1 to 5 according to the present invention are in the range of 50 to 180:1, and values that are much better than 20:1 which is a contrast ratio value of Comparative Example 1 are ensured. Since the contrast ratio value is an index displaying the clearness of the image, the liquid crystal display according to the present invention can implement the clearer image.

The IPS mode liquid crystal display according to the present invention can improve the contrast properties at the front side and at the inclination angle, and thus the clear image of the liquid crystal display can be implemented.

The invention claimed is:

1. An IPS (in-plane switching) mode liquid crystal display, comprising:
   1) a first polarizing plate;
   2) a liquid crystal cell;
   3) a retardation film comprising a positive biaxial acryl-based film and a negative C plate; and
   4) a second polarizing plate,
   wherein the retardation film has an in-plane retardation value represented by Equation 1, in the range of 60 to 150 nm, and a thickness retardation value represented by Equation 2, in the range of 30 to 120 nm:

$$R_{in} = (n_x - n_y) \times d \quad \text{[Equation 1]}$$

$$R_{th} = (n_z - n_y) \times d \quad \text{[Equation 2]}$$

wherein $n_x$ is a refractive index in a direction in which the refractive index is highest in a plane direction of the film,
   $n_y$ is a refractive index in a direction that is vertical to the $n_x$ direction in the plane direction of the film,
   $n_z$ is a refractive index of the thickness direction, and
   d is the thickness of the film.

2. The IPS (in-plane switching) mode liquid crystal display as set forth in claim 1, wherein the first polarizing plate is disposed at a backlight side of the liquid crystal cell, and the second polarizing plate and the retardation film comprising the positive biaxial acryl-based film and the negative C plate are disposed at an observer side of the liquid crystal cell.

3. The IPS (in-plane switching) mode liquid crystal display as set forth in claim 2, wherein an absorption axis of the first polarizing plate and an absorption axis of the second polarizing plate are vertical, an optical axis of the liquid crystal in the liquid crystal cell is parallel to an absorption axis of the first polarizing plate, and an optical axis of the positive biaxial acryl-based film is parallel to the absorption axis of the second polarizing plate.

4. The IPS (in-plane switching) mode liquid crystal display as set forth in claim 1, wherein the first polarizing plate and the retardation film that includes the positive biaxial acryl-based film and the negative C plate are disposed at the backlight side of the liquid crystal cell, and the second polarizing plate is disposed at the observer side of the liquid crystal cell.

5. The IPS (in-plane switching) mode liquid crystal display as set forth in claim 4, wherein an absorption axis of the first polarizing plate and an absorption axis of the second polarizing plate are vertical, an optical axis of the liquid crystal in the liquid crystal cell is parallel to an absorption axis of the second polarizing plate, and an optical axis of the positive biaxial acryl-based film is parallel to the absorption axis of the first polarizing plate.

6. The IPS (in-plane switching) mode liquid crystal display as set forth in claim 1, wherein the positive biaxial acryl-based film of 3) is produced by forming a film according to a melt extruding method or a solution casting method by using an acryl-based polymer and performing a TD (transverse direction) stretching process.

7. The IPS (in-plane switching) mode liquid crystal display as set forth in claim 1, wherein the positive biaxial acryl-based film of 3) comprises an acryl-based copolymer that comprises an acryl-based monomer, an aromatic vinyl monomer, a maleic anhydride-based monomer and a vinylcyan-based monomer.

8. The IPS (in-plane switching) mode liquid crystal display as set forth in claim 1, wherein the positive biaxial acryl-based film of 3) includes a rubber component.

9. The IPS (in-plane switching) mode liquid crystal display as set forth in claim 1, wherein in the positive biaxial acryl-based film of 3), the in-plane retardation value that is represented by the following Equation 1 is in the range of 60 to 150 nm, and the thickness retardation value that is represented by the following Equation 2 is in the range of 100 to 200 nm:

$$R_{in} = (n_x - n_y) \times d \quad \text{[Equation 1]}$$

$$R_{th} = (n_z - n_y) \times d \quad \text{[Equation 2]}$$

wherein $n_x$ is a refractive index in a direction in which the refractive index is highest in a plane direction of the film,
$n_y$ is a refractive index in a direction that is vertical to the $n_x$ direction in the plane direction of the film,
$n_z$ is a refractive index of the thickness direction, and
d is the thickness of the film.

10. The IPS (in-plane switching) mode liquid crystal display as set forth in claim 1, wherein in the positive biaxial acryl-based film of 3), the in-plane retardation value that is represented by the following Equation 1 and the thickness retardation value that is represented by the following Equation 2 has the correlation of $R_{th} > R_{in}$:

$$R_{in} = (n_x - n_y) \times d \quad \text{[Equation 1]}$$

$$R_{th} = (n_z - n_y) \times d \quad \text{[Equation 2]}$$

wherein $n_x$ is a refractive index in a direction in which the refractive index is highest in a plane direction of the film,
$n_y$ is a refractive index in a direction that is vertical to the $n_x$ direction in the plane direction of the film,
$n_z$ is a refractive index of the thickness direction, and
d is the thickness of the film.

11. The IPS (in-plane switching) mode liquid crystal display as set forth in claim 1, wherein the negative C plate of 3) comprises one or more that are selected from the group consisting of polyarylate, polynorbornene, polycarbonate, polysulfone, polyimide, cellulose and a derivative thereof.

12. The IPS (in-plane switching) mode liquid crystal display as set forth in claim 1, wherein in the negative C plate of 3), the in-plane retardation value that is represented by the following Equation 1 is in the range of 0 to 10 nm, and the thickness retardation value that is represented by the following Equation 2 is in the range of −40 to −150 nm:

$$R_{in} = (n_x - n_y) \times d \quad \text{[Equation 1]}$$

$$R_{th} = (n_z - n_y) \times d \quad \text{[Equation 2]}$$

wherein $n_x$ is a refractive index in a direction in which the refractive index is highest in a plane direction of the film, $n_y$ is a refractive index in a direction that is vertical to the $n_x$ direction in the plane direction of the film, $n_z$ is a refractive index of the thickness direction, and d is the thickness of the film.

13. The IPS (in-plane switching) mode liquid crystal display as set forth in claim 1, wherein the thickness of the negative C plate of 3) is in the range of 1 to 30 μm.

14. The IPS (in-plane switching) mode liquid crystal display as set forth in claim 1, wherein the thickness of 3) the retardation film is in the range of 20 to 100 μm.

15. The IPS (in-plane switching) mode liquid crystal display as set forth in claim 1, wherein the $R_{th}/R_{in}$ value of 3) the retardation film is in the range of 1.1 to 6.

16. The IPS (in-plane switching) mode liquid crystal display as set forth in claim 1, wherein 3) the retardation film further comprises a buffer layer between the positive biaxial acryl-based film and the negative C plate.

17. The IPS (in-plane switching) mode liquid crystal display as set forth in claim 1, wherein 3) the retardation film further comprises an adhesive layer between the positive biaxial acryl-based film and the negative C plate.

18. The IPS (in-plane switching) mode liquid crystal display as set forth in claim 17, wherein the adhesive layer is coated on the negative C plate layer or transferred on the acryl-based film.

19. The IPS (in-plane switching) mode liquid crystal display as set forth in claim 1, wherein 3) the retardation film is disposed between 4) the second polarizing plate and 2) the liquid crystal cell, the negative C plate of 3) the retardation film is disposed to contact with 2) the liquid crystal cell.

20. The IPS (in-plane switching) mode liquid crystal display as set forth in claim 1, wherein 4) the second polarizing plate comprises a polarizing element, and further comprises a protective film between the polarizing element and the positive biaxial acryl-based film.

21. The IPS (in-plane switching) mode liquid crystal display as set forth in claim 1, wherein 2) the liquid crystal cell comprises the liquid crystal that has the positive dielectric anisotropic property ($\Delta \in > 0$), and is horizontally aligned.

* * * * *